May 21, 1946.　　　　L. W. FOSTER　　　　2,400,749
PROTECTIVE ARRANGEMENT
Filed June 19, 1942
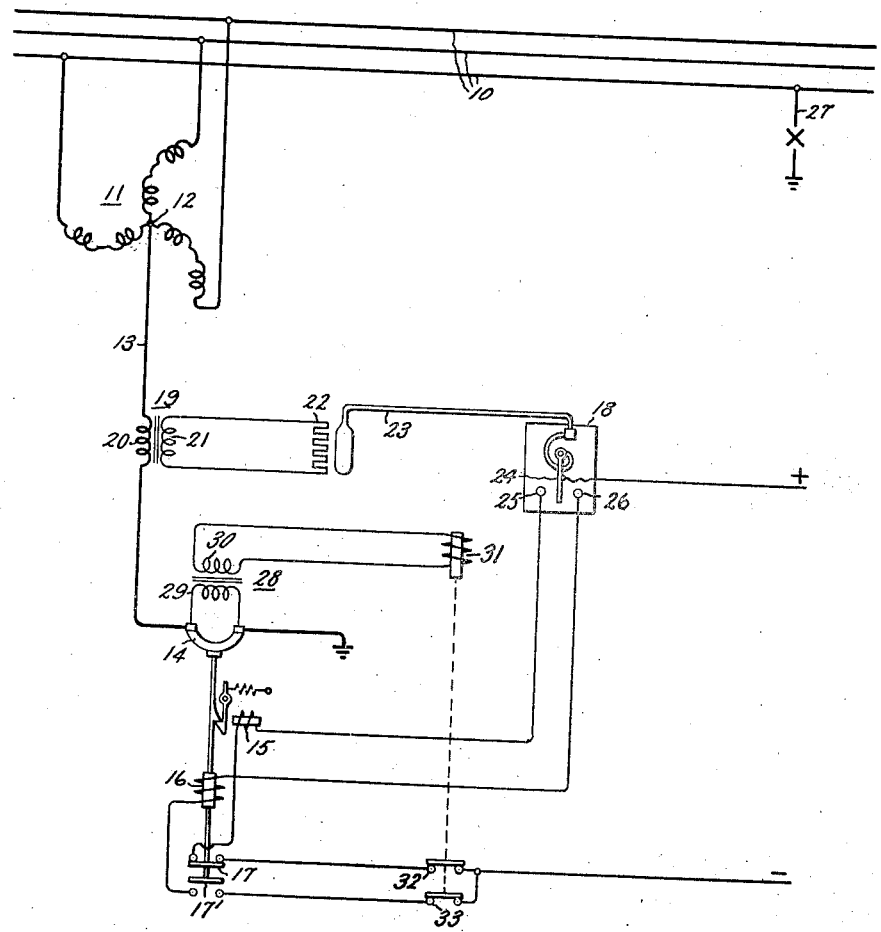
Inventor:
Levin W. Foster,
by Harry E. Dunham
　　His Attorney.

Patented May 21, 1946

2,400,749

UNITED STATES PATENT OFFICE 2,400,749

PROTECTIVE ARRANGEMENT

Levin W. Foster, Pittsfield, Mass., assignor to General Electric Company, a corporation of New York Application June 19, 1942, Serial No. 447,620

6 Claims. (Cl. 175—294)

My invention relates to a protective arrangement and more particularly to a protective arrangement for an electric device or apparatus which serves either solely or among other purposes as a grounding device.

It is sometimes desirable to provide a ground connection for a polyphase alternating-current electric system at a point where no star or Y-connected transformers or generators are available to facilitate the making of such a connection. By means of a suitable grounding device which usually takes the form of a Y-connected impedance device, such as a reactance or a grounding transformer, it is possible to utilize zero-sequence currents or ground currents to operate various ground relays and the like to carry out the desired protection of associated electrical systems. Consequently, where the neutral of a polyphase system, such as a three-phase system, is not available, it is necessary to provide a so-called "grounding transformer," which provides a neutral which may be grounded. It should be understood, however, that a special grounding device need not be provided since a generator or supply transformer bank may serve as the grounding device.

With the neutral of the system grounded through a suitable grounding device which, as mentioned above, may be a separate device or the supply transformer bank or generator additional relaying quantities are available for selective tripping of circuit breakers associated with the system. Under normal conditions of the system, no ground current flows and, consequently, the grounding device as such serves no useful purpose. However, if the grounding device which is a separate transformer or impedance, is constructed so as to carry the current on long sustained ground faults or on repeated faults, such as occur during a thunder storm or the like, a relatively costly grounding device is required. Also, if the grounding device is the supply generator or a supply transformer bank, generally such apparatus cannot carry fault current continuously. On the other hand, a grounding device which has a short-time rating sufficient for any fault condition which might occur will usually suffice since the protective relays will operate within a few cycles to clear the fault or other abnormal condition causing ground current to flow. My invention is particularly concerned with the utilization of a reduced capacity grounding device, which may be a separate grounding transformer or some of the apparatus used to supply power to the system, which has sufficient capacity for the purpose when the various relays and associated protective devices function properly promptly to eliminate the fault but does not have sufficient capacity to carry fault current continuously. It should be understood that the expression "grounding device" used in this specification and appended claims refers to any device whether operating solely as a grounding device or whether it performs additional functions.

Accordingly, it is an object of my invention to provide a new and improved protective arrangement for a portion of an electric system.

It is another object of my invention to provide a new and improved arrangement for converting a grounded neutral system to an isolated neutral system when the faults existing on the system are such as to endanger some of the equipment.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which the single figure thereof is a diagrammatic representation of a protective system embodying my invention.

Referring now to the drawing, I have illustrated an electric system 10 which is preferably a polyphase alternating-current system and which has been specifically illustrated as a three-phase system. System 10 may be operated as a grounded neutral system by grounding a suitable star-connected winding associated therewith, such as the supply generator or supply transformer bank. If a suitable star or Y-connected generator or transformer is not available at the portion of the system 10 where a ground connection is desired, such grounding may be accomplished by the provision of a suitable grounding device which may comprise a grounding transformer or a grounding reactor. This grounding device, generally indicated in the drawing at 11 is illustrated as a separate impedance device comprising a three-phase zigzag Y-connected reactance device having a neutral terminal 12. The phase terminals of the grounding device 11 are connected respectively to the phase conductors of polyphase system 10. It should be understood by those skilled in the art that grounding device 11 if used solely as a grounding device might include the conventional two-winding transformer instead of the single zigzag Y-connected reactance illustrated.

The neutral point 12 of grounding device 11 is preferably connected to ground through ground conductor 13 and circuit-interrupting device 14 which is generally indicated as of the latched closed type of circuit breaker having a trip coil 15, a closing coil 16, an *a* switch 17, which is closed when the circuit breaker is closed and open when the circuit breaker is open, and a *b* switch 17', which is open when the circuit breaker is closed and closed when the circuit breaker is open.

Grounding device 11 is constructed so as to be capable of carrying the ground fault current for a short period of time, sufficiently long for the protective apparatus associated with polyphase alternating-current system 10 to function and clear the fault. However, in the event of a sustained fault or in the event of repeated faults such as might occur during a thunderstorm, grounding device 11 might be heated to a value which might cause considerable damage to itself and perhaps also to associated apparatus. Rather than go to the expense of providing a much more costly grounding device, which would carry sustained fault currents without overheating, I have provided means for opening circuit breaker 14 when the temperature of grounding device 11 exceeds a safe value, thereby converting a grounded neutral system to an isolated neutral system. Accordingly, I provide a temperature-responsive device 18 which may comprise any suitable device, for example, a device similar to that disclosed in United States Letters Patent No. 2,026,375, assigned to the same assignee as the present application. Temperature indicator or temperature-responsive device 18 is preferably constructed to operate in response to the temperature of grounding device 11. Quite often, such a grounding device comprises a liquid immersed translating apparatus or impedance device and the internal temperature of the device or apparatus, is, of course, higher than that of the liquid in which it is immersed except when no load is being carried.

To simulate the temperature of grounding device 11, which is used solely as a ground device as indicated in the drawing, I provide a current transformer 19 having a primary winding 20 connected in the grounded neutral conductor 13. The secondary winding 21 of current transformer 19 is connected to a heating element 22 which, in turn, causes fluid in the bulb of the capillary tube 23 to expand and temperature indicator 18 to operate. It will be obvious to those skilled in the art, that, with the arrangement described, temperature indicator 18 may be made to operate in accordance with the temperature of grounding device 11.

In order to control the ground connection of grounding device 11, temperature-responsive device 18 is provided with a switching element 24 adapted to engage contact 25 when the temperature of grounding device 11 reaches a predetermined high value above which safe operation is no longer insured. Also, temperature-responsive device 18 is provided with a contact 26 which is engaged by switching member 24 when the grounding device has cooled to a predetermined relatively low temperature. Contact 25 is connected in series with trip coil 15 and *a* switch 17 of circuit breaker 14 to a source of control potential so that, when switching member 24 engages contact 25, circuit breaker 14 is tripped to the open position. Contact 26, on the other hand, is connected in series with closing coil 16 and the contacts associated with the *b* switch 17' of circuit breaker 14 so that, when contact 26 is engaged by switching member 24, circuit breaker 14 is moved to the closed position by virtue of energization of closing coil 16.

With the arrangement discussed thus far and the circuit breaker 14 in the normal or closed position indicated, if a ground fault occurs on one of the conductors of polyphase alternating-current system 10 as indicated at 27 for example, current will flow in ground conductor 13 which will cause the grounding device to heat and, if the fault indicated at 27 is not removed by the operation of the protective relays, not shown, temperature-responsive device 18 will operate to move switching member 24 in a direction to engage contact 25, whereupon tripping of circuit breaker 14 will result. As soon as the grounding device 11 has cooled sufficiently, switching member 24 of temperature-responsive device 18 will move to engage contact 26 to initiate reclosing of circuit breaker 14. It will be obvious then that, for sustained faults, grounding device 11 without the provision of additional means will heat and cool in a periodical manner; in other words, a sort of hunting will result. Consequently, to eliminate this undesirable hunting or heating and cooling under sustained fault conditions, I provide a potential transformer 28 having a primary winding 29 connected across the terminals of circuit breaker 14. A secondary winding 30 of potential transformer 28 is connected to energize a winding of a potential relay 31 having a plurality of normally closed contacts 32 and 33. The contacts 32 are connected in series with trip coil 15 and the contacts 33 are connected in series with closing coil 16. With this arrangement, if the ground fault persists after heating of grounding device 11 has caused circuit breaker 14 to open, a voltage will be impressed across the primary winding 29 of potential transformer 28 to cause operation of relay 31 and consequent opening of contacts 32 and 33, whereupon control of circuit breaker 14 is taken away from temperature-responsive device 18, which is rendered ineffective as long as the fault persists. As soon as the sustained fault is eliminated, relay 31 will be deenergized and control of the grounding connection of grounding device 11 will be returned to temperature-responsive device 18.

In view of the detailed description included above, the operation of the protective arrangement embodying my invention will be obvious to those skilled in the art and only a brief discussion will be included hereinafter. Under normal unfaulted conditions of system 10, circuit breaker 14 will be closed to complete the ground connection through ground conductor 13 and grounding device 11. However, no current will flow through this ground connection. In the event of a ground fault on system 10, a ground current will flow through grounding device 11 and ground conductor 13, which would be utilized to operate protective relays not shown. Grounding device 11 is designed with sufficient capacity to take care of any ground currents which might flow for a short period of time. In the event of a sustained fault, temperature-responsive device 18 will operate to convert the system having a normally grounded neutral to an isolated neutral system through initiating the opening of circuit breaker 14. The grounding connection will again be completed as soon as the grounding device 11 cools sufficiently to permit switching member 24 to engage contacts 26. In the event of a sustained fault, however, relay 31 will render temperature-responsive device 18 ineffective so that the neutral 12 of grounding device 11 will remain isolated until the ground fault is cleared even though grounding device 11 has cooled to a predetermined value at which safe operation would normally be initiated.

It will be understood by those skilled in the art that the converting of a grounded neutral system to an isolated neutral system as disclosed above does not defeat the purpose of the grounding since such conversion does not take place until after the major purpose of grounding the neutral has been accomplished, namely, providing a means for obtaining zero-sequence quantities for relaying purposes. Ground faults which involve a high impedance so that low currents flow insufficient to cause operation of protective relays will probably also be insufficient to cause heating of the grounding device to an extent to cause circuit breaker 14 to open. On the other hand, dead short circuits which would cause sufficient heating of grounding device 11 would also normally cause operation of the protective relays.

It will be obvious from the above description that my invention permits the use of a relatively inexpensive grounding device and yet adequate protection both to the system and the grounding device is afforded.

While I have shown and described my invention as applied to a particular system of connections, and as embodying various devices diagrammatically shown, it will be obvious to those skilled in the art that changes and modifications may be made without departing from my invention and I, therefore, aim in the appended claims to cover all such changes and modifications as fall within the spirit and scope of my invention.

What I claim as new and desire to secure by Letters Patent of the United States is:

1. In combination with an electric circuit, a grounding device connected to said circuit capable of carrying ground currents which might flow for a relatively short interval of time but incapable of carrying sustained ground currents without undue temperature rise, said grounding device having a ground connection including a circuit-interrupting device in said connection, means operative in accordance with a predetermined relatively high temperature of said grounding device for causing opening of said circuit-interrupting device, means for causing closing of said circuit-interrupting device in accordance with a predetermined relatively low temperature of said grounding device, and means controlled in response to a sustained fault on said circuit tending to cause ground current to flow for rendering said last mentioned means ineffective to control said circuit interrupter.

2. In combination with an electric circuit, a grounding device connected to said circuit capable of carrying ground currents which might flow for a relatively short interval of time but incapable of carrying sustained ground currents without undue temperature rise, said grounding device having a ground connection including a circuit-interrupting device in said connection, means operative in accordance with a predetermined relatively high temperature of said grounding device for causing opening of said circuit-interrupting device, means for causing closing of said circuit-interrupting device in accordance with a predetermined relatively low temperature of said grounding device and means responsive to the potential across said circuit-interrupting device for rendering said last-mentioned means ineffective to control said circuit interrupter in the event of a sustained fault on said circuit tending to cause ground current to flow.

3. In combination with an electric circuit, a grounding device connected to said circuit capable of carrying ground currents which might flow for a relatively short interval of time but incapable of carrying sustained ground currents without undue temperature rise, said grounding device having a ground connection including a circuit-interrupting device in said connection, means operative in accordance with a predetermined relatively high temperature of said grounding device for causing opening of said circuit-interrupting device, means for causing closing of said circuit-interrupting device when a predetermined relatively low temperature of said grounding device is attained, a potential transformer connected across said circuit-interrupting device, and relay means energized from said potential transformer for rendering said last-mentioned means ineffective to control said circuit interrupter in the event of a sustained fault on said circuit tending to cause a potential across the terminals of said circuit-interrupting device.

4. In combination with an electric circuit, a grounding device connected to said circuit capable of carrying ground currents which might flow for a relatively short interval of time but incapable of carrying sustained ground currents, said grounding device having a ground connection including a circuit-interrupting device in said connection, means operative in accordance with a predetermined condition of said grounding device for causing opening of said circuit-interrupting device, means for causing closing of said circuit-interrupting device in accordance with a different predetermined condition of said grounding device, and means for rendering said last-mentioned means ineffective to control said circuit interrupter in the event of a sustained fault on said circuit tending to cause ground current to flow.

5. In combination with an electric circuit, a grounding device connected to said circuit capable of carrying ground currents which might flow for a relatively short interval of time but incapable of carrying sustained ground currents, said grounding device having a ground connection including a reclosing circuit-interrupting device in said connection, means operative in accordance with a predetermined condition of said grounding device for causing opening of said circuit-interrupting device, and means for causing closing of said circuit-interrupting device in accordance with a different predetermined condition of said grounding device.

6. In combination with an electric circuit, a grounding device connected to said circuit capable of carrying ground currents which might flow for a relatively short interval of time but incapable of carrying sustained ground currents without undue temperature rise, said grounding device having a ground connection including a reclosing circuit interrupting device in said connection, means operative in connection with a predetermined relatively high temperature of said grounding device for causing opening of said circuit-interrupting device, and means for causing closing of said circuit interrupting device in accordance with a predetermined relatively low temperature of said grounding device.

LEVIN W. FOSTER.